United States Patent Office 2,787,892
Patented Apr. 9, 1957

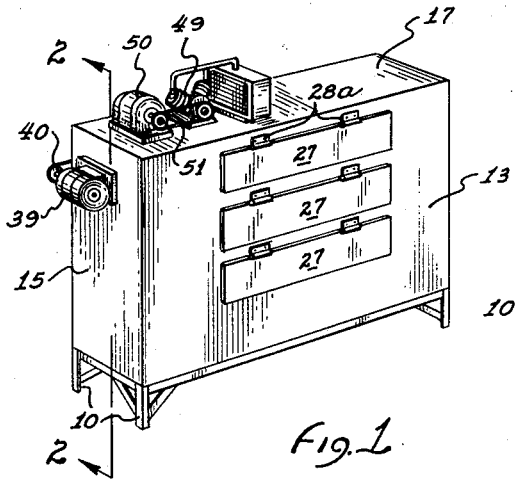
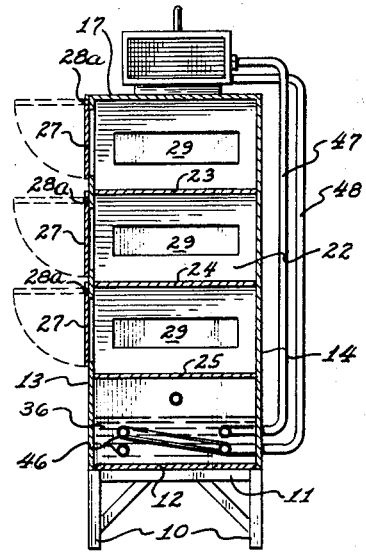
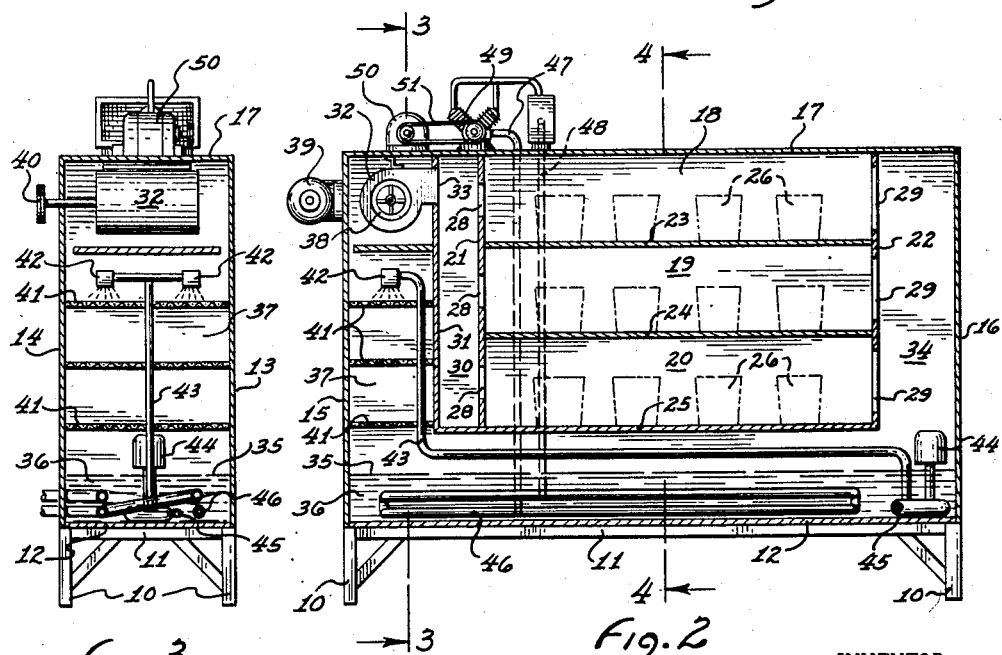
INVENTOR.
JESSE P. PEARCE.

2,787,892

REFRIGERATING AND HUMIDIFYING APPARATUS FOR FOODS

Jesse Philip Pearce, Mesa, Ariz.

Application March 15, 1956, Serial No. 571,790

3 Claims. (Cl. 62—102)

This invention pertains to improvements in refrigerating apparatus and is particularly directed to an improved egg cooling device especially adapted to maintain proper temperature and humidity to chill the eggs immediately after they are gathered from the nests.

One of the problems in cooling eggs or similar food products is to maintain the proper low temperature and also at the same time maintain a high relative humidity so that the foods are not dehydrated and caused to deteriorate from the severe chilling operation if high humidity is not properly maintained.

One of the basic objects of this invention is to provide an improved refrigerating apparatus especially adapted for egg and food cooling purposes which maintains a flow of humid chilled air over the products to be cooled.

Still another object of this invention is to provide an improved egg cooling apparatus in which buckets or containers of the eggs may readily be placed in or removed from a series of compartments without interrupting the normal cooling cycle and air circulation of the apparatus.

Still another object of this invention is to provide an improved refrigerating apparatus for eggs and the like in which a blower circulates a constant flow of air over the items to be chilled, said air being circulated over a refrigerated reservoir of water and also up through a spray apparatus for return to the food elements to be cooled.

Still another object of this invention is to provide a compartmentalized cooling unit for refrigerating eggs or the like in which the relative humidity and temperature of the device are closely controlled at all times.

Still another object of this invention is to provide an improved egg cooling device or the like in which there are a series of vertically disposed horizontal compartments, each having access doors at one side thereof for the placement in or removal of the material to be cooled. While the air flows longitudinally through said compartments from one end to the other and then downwardly over the surface of a chilled reservoir of water and then the air finally passing upwardly through a series of screens which are moistened by a spray device at the top of the upward movement of said air column and then received by a blower for discharge again through the compartments as aforementioned.

Further features and advantages of this invention will appear from a detailed description of the drawings in which:

Fig. 1 is a general perspective view of the refrigerating apparatus incorporating the features of this invention.

Fig. 2 is an enlarged vertical section on the line 2—2 of Fig. 1.

Fig. 3 is a vertical transverse section on the line 3—3 of Fig. 2.

Fig. 4 is a vertical transverse section on the line 4—4 of Fig. 2.

As an example of one embodiment of this invention there is shown a refrigerating apparatus in the form of an egg and food cooler comprising a frame consisting of the supporting legs 10 and the top rails 11 which supports the bottom 12 of the upper portion of the unit. Appropriate sides 13 and 14 and ends 15 and 16 are integrally connected with the bottom 12 and with a suitable top 17. Food compartments 18, 19 and 20 are formed by the end panels 21 and 22 formed integral with the sides 13 and 14 of the unit. Bottoms 23, 24 and 25 are also formed integral with the sides 13 and 14 and the end panels 21 and 22 upon which may be placed the food containers such as the buckets 26 containing eggs or the like to be cooled in the apparatus. Suitable access doors 27 hingedly connected at 28a provide means for placement and removal of the food material such as 26 in the compartments 18, 19 and 20.

Air inlet openings are formed at 28 in the end panel 21 and air discharge openings 29 are formed in the end panel 22. An air input manifold chamber 30 is formed around the outside of the end panel 21 and communicates with the air inlets 28. The outer end of the air input manifold 30 is formed by a panel 31 which extends between the sides 13 and 14 is connected integrally with the bottom 25.

A blower 32 is mounted in the cabinet between the end 15 and the panel 31 and at the upper end thereof and has a discharge opening 33 opening into the air input manifold 31 so that air is discharged through the openings 28 across the food compartments 18, 19 and 20 and escapes out through the discharge openings 29 in the end panel 22. Discharged air from the openings 29 passes downwardly through the discharge manifold 34 formed between the end panel 22 and the end 16 and then returns under the bottom 25 along the top surface 35 of the water supply 36 contained in the reservoir formed by the bottom 12 and the bottom portions of the sides 13 and 14 and the ends 15 and 16 of the unit. Suitable means, not shown, maintain the water level at substantially the position 35. The discharged air from the food compartments 18, 19 and 20 thus returns under the bottom surface 25 and then upwardly through the absorption chamber 37 formed between the end 15 and the panel 31 where it returns at the upper end of said absorption chamber to the suction inlet portion 38 of the blower 32. A suitable drive motor 39 belted at 40 to the blower provides means for actuating the fan of the blower.

In the absorption chamber 37 is mounted a series of gauze filter pads 41 above the upper one of which is mounted the discharge water nozzles 42 which are connected through a supply pipe 43 to a water pump 44 having a suction inlet 45 located on the opposite end of the unit and reservoir water supply 36 from the point of discharge of the water from the nozzles 42 over the gauze pads 41.

A refrigeration coil 46 is mounted below the surface 35 of the water supply 36 and is connected by suitable piping 47 and 48 in a well known manner to a refrigeration compressor 49, the compressor in turn being driven by suitable drive motor 50 and the belt 51. The details of the refrigeration system for maintaining the coil 46 at a low temperature, preferably near the freezing point, forms no part of this invention, and any commercially available apparatus may be substituted for this operation. The point to note is that the cooling coil 46 maintains the water 36 at or near freezing. The water pump 44 delivers water at the nozzles 42 which precipitate down over the gauze pads 41 while the air is being sucked upwardly through these pads 41. This affects the cooling of the air circulated by the blower 32 and at the same time causes the air to absorb the necessary humidity to maintain a high moisture content and cool air as it moves over the food in the chambers 18, 19 and 20. It is further important to note that the coldest part of the coolant water is at the opposite end from where the drippings from the pads 41 come down on the surface 35 of the water 36. Thus, the water must travel the long path adjacent to the refrigerator coils 46 to finally get to the intake 45 of the water pump 44 resulting in maximum cooling temperature of the water as it is finally discharged from the nozzles 42. It will also be noted that the direction of air circulation in the food compartments 18, 19 and 20 are parallel to the access doors 27 and horizontally across the food elements 26 in the compartments 18, 19 and 20 thus resulting in a highly efficient cooling operation and a minimum of heat loss when the doors 27 are open for inserting or removing food from the device. It will also be noted that there is a long path of return air travel across the surface 35 of the liquid beginning at the colder end of the liquid 36 and proceeding toward the gauze absorption filters 41 as described. Thus, a uniformity of cooling action and high efficiency is obtained with this apparatus.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

I claim:

1. In a refrigerating apparatus for cooling and humidfying food items, a plurality of vertically disposed food compartments, access doors in the sides thereof, air inlets at one end of said compartments, air discharge openings at the other ends of said compartments, an air input manifold communicating with said air inlets, a blower connected to supply air to said input manifold, an air discharge manifold communicating with said air outlets, a water supply reservoir located below said food compartments and communicating with the bottom of said air discharge manifold, a vertically disposed absorption chamber located adjacent said air input manifold and connected at its upper end to the intake of said blower so that air may be circulated by said blower horizontally through said food compartments and returning horizontally in the opposite direction across the top of a water supply in said reservoir and upwardly through said absorption chamber, means for refrigerating the water in said reservoir, and means in said chamber to cause water in said reservoir to be absorbed by said upwardly flowing air stream in said absorption chamber, said last mentioned means comprising a series of gauze pads, water discharge nozzles precipitating on said pads, a water pump sucking water from said reservoir, and means connecting the discharge from said pump to said nozzles.

2. In a refrigerating apparatus for cooling and humidifying food items, a plurality of vertically disposed food compartments, access doors in the sides thereof, air inlets at one end of said compartments, air discharge openings at the other ends of said compartments, an air input manifold communicating with said air inlets, a blower connected to supply air to said input manifold, an air discharge manifold communicating with said air outlets, a water supply reservoir located below said food compartments communicating with the bottom of said air discharge manifold, a vertically disposed absorption chamber located adjacent said air input manifold and connected at its upper end to the intake of said blower so that air may be circulated by said blower horizontally through said food compartments and returning horizontally in the opposite direction across the top of a water supply in said reservoir and upwardly through said absorption chamber, means for refrigerating the water in said reservoir, means in said chamber to cause water in said reservoir to be absorbed by said upwardly flowing air stream in said absorption chamber, said means comprising a series of horizontal gauze pads vertically spaced in said absorption chamber, water discharge nozzles above said pads, a water pump having an inlet located in the water in said reservoir at the opposite end thereof from said absorption chamber, and means connecting the discharge from said pump to said nozzles.

3. In a refrigerating apparatus for cooling and humidifying food items, a plurality of vertically disposed food compartments, access doors in the sides thereof, air inlets at one end of said compartments, air discharge openings at the other ends of said compartments, an air input manifold communicating with said air inlets, a blower connected to supply air to said input manifold, an air discharge manifold communicating with said air outlets, a water supply reservoir located below said food compartments and communicating with the bottom of said air discharge manifold, a vertically disposed absorption chamber located adjacent said air input manifold and connected at its upper end to the intake of said blower so that air may be circulated by said blower horizontally through said food compartments and returning horizontally in the opposite direction across the top of a water supply in said reservoir and upwardly through said absorption chamber, means for refrigerating the water in said reservoir, means in said chamber to cause water in said reservoir to be absorbed by said upwardly flowing air stream in said absorption chamber, said means comprising a series of horizontal gauze pads vertically spaced in said absorption chamber, water discharge nozzles above said pads, a water pump having an inlet located in the water in said reservoir at the opposite end thereof from said absorption chamber, and means connecting the discharge from said pump to said nozzles, said means for refrigerating said water including a horizontally disposed cooling coil extending longitudinally of said reservoir so that water flows along said coil from the drip area under said absorption chamber to the inlet of said pump.

References Cited in the file of this patent
UNITED STATES PATENTS 1,859,613    Bailey                May 24, 1932